United States Patent [19]

Andro et al.

[11] 4,014,671

[45] Mar. 29, 1977

[54] DEVICE FOR SEPARATING DROPS OF LIQUID CONTAINED IN A GAS STREAM

[75] Inventors: Jean Andro, La Celle St-Cloud; Jean-Pierre Peyrelongue, Issy-les-Moulineaux, both of France

[73] Assignee: Stein Industrie S.A., Velizy-Villacoublay, France

[22] Filed: June 19, 1975

[21] Appl. No.: 588,621

[30] Foreign Application Priority Data

June 21, 1974 France .................... 74.21612

[52] U.S. Cl. .......................... 55/325; 55/331; 55/442; 55/463; 55/DIG. 23; 122/492
[51] Int. Cl.² ........................... B01D 50/00
[58] Field of Search .......... 55/325, 326, 331, 332, 55/336, 337, 183–186, 201, 442, 447, 463, DIG. 22, DIG. 23, 321; 122/34, 488, 492

[56] References Cited

UNITED STATES PATENTS

| 540,539 | 6/1895 | Conness | 55/336 |
|---|---|---|---|
| 630,023 | 8/1899 | Baker | 55/DIG. 22 |
| 1,455,348 | 5/1923 | Moffat | 55/442 |
| 2,158,863 | 5/1939 | Randall | 55/463 |
| 2,193,883 | 3/1940 | Reeves | 55/337 |
| 2,434,663 | 1/1948 | Letvin | 55/186 |
| 3,501,900 | 3/1970 | Warner et al. | 55/337 X |
| 3,870,493 | 3/1975 | Kall et al. | 55/463 |

FOREIGN PATENTS OR APPLICATIONS 2,046,878  12/1971  France

*Primary Examiner*—Frank W. Lutter
*Assistant Examiner*—David L. Lacey
*Attorney, Agent, or Firm*—William R. Woodward

[57] ABSTRACT

A device for separating drops of liquid from a stream of gas or steam comprises a closed casing having a horizontal inlet and an outlet respectively having their openings in two compartments separated by a vertical grid, a deflecting nozzle in coaxial relation with the inlet and providing a slit leading to a gap external of the nozzle forming part of a first collecting chamber which communicates with a reservoir, a cusped inner shell cooperating with the nozzle coaxially and provided with a trailing edge forming a slit with an overlapping edge of a second collecting chamber which also communicates with the reservoir, and means for the fine separation of liquid known in the prior art which are placed between the vertical grid and the outlet.

7 Claims, 2 Drawing Figures

DEVICE FOR SEPARATING DROPS OF LIQUID CONTAINED IN A GAS STREAM

This invention relates to the mechanical separation of drops of a liquid which are contained in suspension in a gas stream.

The present invention is concerned both with the case of a two-phase mixture of the same substance, or in other words a saturated vapor in which the drops are accordingly constituted by the same substance as the gas stream, and with the case in which the gas stream contains in suspension drops of a liquid of a substance other than that which constitutes the gas stream.

There are already a number of known solutions to this problem in which recourse is had in particular to the use of centrifugal force as applied differently to the drops and to the gas, thus permitting recovery of the drops at the periphery of devices which are designed to produce a helical or centrifugal flow.

Among other applications, devices of known types are employed for the rough drying of steam discharged from the high-pressure shells of steam turbines in nuclear power stations.

Satisfactory fine separators are available for producing dry steam from wet steam, for example, and it is known to arrange them in a vertical wall array from which the liquid is drained at the bottom, the array being constituted as a dividing wall in a closed chamber into which wet steam is fed on one side of the fine separator array and dry steam is taken from an outlet of the chamber on the other side of the separator array, but the efficiency of the devices that operate as well as fine separators is impaired if an excessive quantity of liquid droplets is contained in the wet steam. The provision of the centrifugal type of devices above mentioned to remove excess liquid ahead of the fine separator results in inconveniently bulky structures.

One object of the inventon is to permit treatment of a very high flow rate of gas in a two-stage separator having a single preseparating element having reasonable dimensions preceding a known type of fine separator.

SUMMARY OF THE INVENTION

Briefly, a first separator stage is provided in a first compartment of a closed casing that is separated from a second compartment, containing the fine separators, by a vertical grid through which gas proceeds from the first separator stage to the second. The bottom of the casing provides a reservoir into which the drains of the collecting chambers of the first separator as well as the drain of the fine separators lead. The gas outlet pipe from the casing is of course located in the wall of the second compartment on the downstream side of the fine separators. The inlet duct into the casing has an enlarged portion where it is connected to the casing and the tubular upstream end of a first deflecting member of the first separator stage projects coaxially into the enlarged portion of the inlet duct, leaving a gap between the upstream edge of this tubular end and the beginning of the enlarged portion of the inlet duct. This first deflecting member has an outwardly flaring surface in its downstream portion which is then continued so as to enclose a first collecting chamber between it and the casing, which chamber communicates with the inlet duct through the gap just mentioned, so as to trap liquid droplets collecting along the wall of the inlet duct and being propelled forward by the gas stream. The first collecting chamber is drained to the reservoir at the bottom of the casing and preferably vented to the first compartment of the interior of the casing so as to provide an aspirating action for drawing the liquid droplets into the collecting chamber. A second deflecting member shaped in a surface of revolution with a projecting upstream end, preferably in the form of a cusp, extends coaxially into the downstream end of the first deflecting member and has a downstream edge leading into an annular entrance slit of a second collecting chamber, which likewise drains into the reservoir at the bottom of the casing. The second collecting chamber is preferably vented, this time to the second compartment of the casing. This vent is preferably arranged by a stub pipe carrying a baffle plate, so that the second collecting chamber has a toroidal portion which has a restricted outlet into the volume behind the central portion of the second deflecting member, from which there is a vent through the stub pipe to the second compartment of the casing.

The back wall of the second collecting chamber is preferably in alignment with the grid separating the first and second compartments of the casing and has an incurved rim forming the outer edge of the entrance slits of the second collecting chamber and for that purpose overlapping slightly the downstream edge of the second deflecting member, the latter having a reversely curved terminal lip leading into the slit and into the chamber. In a modified form of the invention, the second collecting chamber has two or more coaxial entrance slits separated by intermediate annular shells having a leading edge slightly overlapping the upstream member on the opposite side of one entrance slit and a trailing edge curved so as to lead another entrance slit into the chamber.

The upstream projecting portion of the second deflecting member is preferably in the shape of a cusp. The first and second deflecting members have cooperating flared surfaces of revolution defining a smoothly spreading path without constriction for the gas proceeding from the inlet pipe to the part of the first compartment adjacent to the grid through which the gas flows to enter the second compartment, thus allowing a high rate of flow of the gas through the first separator stage to the fine separators located in the second compartment.

Good flow guidance of the gas stream is ensured by the fact that the curved surfaces of revolution of the first collecting means and of the second deflecting means have curvatures which are adapted to mitigate turbulent flow.

In yet a further embodiment of the invention, the toric chamber has a number of parallel circular slits which improve the efficiency of the apparatus.

BRIEF DESCRIPTION OF THE DRAWINGS

The following description relates to non-limitative examples of construction which are described with reference to the accompanying drawings, wherein.

DESCRIPTION OF THE PREFERRED EMBODIMENTS

The following description is concerned with the particular case of treatment of saturated steam but, as mentioned earlier, the invention is generally applicable to the separation of drops of a liquid in a gas stream.

Figure 1:
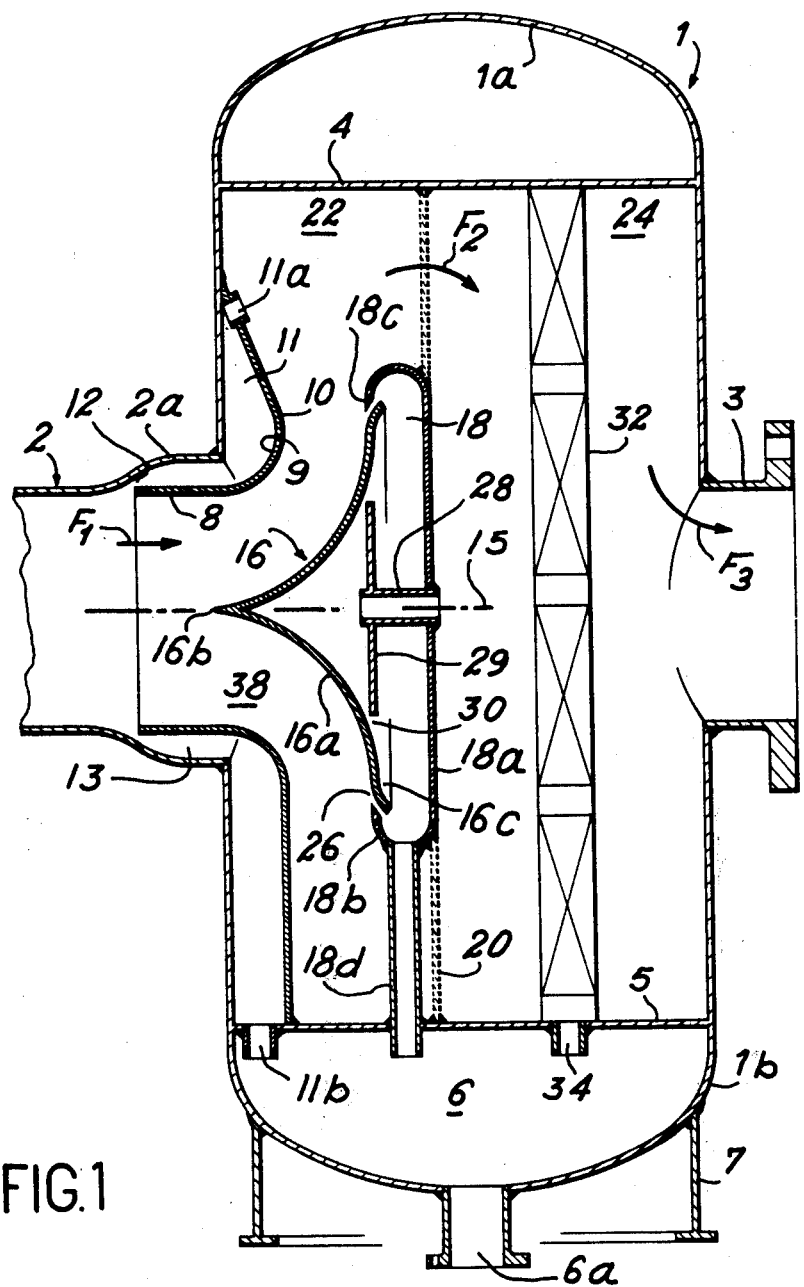
FIG. 1 is a diagrammatic view in sectional elevation showing the a two-stage separator incorporating an initial separator stage in accordance with the invention.

In FIG. 1, a two-stage separator is shown which is housed in a casing 1 provided with an inlet duct 2 for the admission of wet or saturated steam, said duct being connected to the casing 1 by an enlarged dust portion 2a. The treated steam is discharged through an outlet duct 3 which is diametrically opposite to the inlet duct portion 2a.

The enlarged duct portion 2a is provided for reasons which will be explained hereinafter. The casing 1 has two doomed end-walls or caps 1a, 1b with intermediate support plates 4 and 5 so as to permit the assembly of the internal components of the separator stages. The lower end caps 1b and the support plate 5 form a reservoir 6 with a discharge connection 6a.

The complete two-stage separator shown in the figure is mounted on a base 7 which is attached to the bottom end cap 1b.

The first separation stage, or "preseparator", accepts an input wet steam trapped into a nozzle shell 8 having a diameter which is equal to that of the inlet duct. The nozzle 8 has curved sheet material portion 9 in the shape of a curved surface of revolution and this latter is faired out into a contiguous partition-wall 10 which is rigidly fixed to the casing 1 and to the bottom support plate 5 so as to form a first collecting chamber 11 fed by the annular trap slit 12 in front of the nozzle shell 8.

The position of the upstream end of the nozzle shell 8 extending into the inlet 2a duct portion defines the width of the annular slit 12 already mentioned, which communicates through an annular space 13 (formed by the difference in diameter between the nozzle shell 8 and the duct portion 2a) with the first collecting chamber 11. That chamber is provided with a top vent 11a which communicates with the interior of the casing 1 and with a drain outlet 11b in the support plate 5 which communicates with the reservoir 6.

Projecting centrally into the nozzle shell 8 from the interior of the casing 1 and centered, on the axis 15 of the duct 2, 2a which is aligned radially in the casing 1, is a cooperating deflecting shell 16 which has a curved surface of revolution 16a with sharp cusp 16b directed along the axis 15 and towards the inlet duct portion 2a. The trailing edge 16c of the shell 16 is curved inwards with a curvature opposite to that of the lateral surface 16a.

A feature of the design of the illustrated embodiment is that the trailing edge 16c extends into toroidal chamber 18 (i.e. having the shape of a torus) which is also concentric with the radial axis 15. The rear end-wall 18a of the chamber 18 is rigidly fixed to a perforated central partition-wall or separating grid 20 which divides the casing 1 into two compartments 22 and 24.

The open face 18b of the toroidal chamber 18 has an edge 18c which is placed in overlapping relation with the trailing edge 16c so as to form a circular slit 26 which communicates with the interior of the chamber 18. A drainpipe 18d connects the bottom portion of the chamber 18 to the reservoir 6.

The rear end-wall 18a of the chamber 18 which is common with the partition-wall 20 is provided with an axial stub-pipe 28 and this latter is fitted with a deflector 29 which penetrates into the rear cavity of the shell 16 while forming a circular space or slit 30. A passageway for the steam is thus established between the slit 26, the chamber 18, the slit 30 and the stub-pipe 28.

All the elements of the preseparator which have been described in the foregoing are contained in the first compartment 22. The second compartment 24 contains fine separators 32 which are known per se and intended to produce dry steam. These separators are mounted in a wall-like array between the partition-wall 20 and the outlet duct 3 by being secured to the support plates 4 and 5. A drain outlet 34 provides communication between the separators 32 and the reservoir 6.

Figure 2:
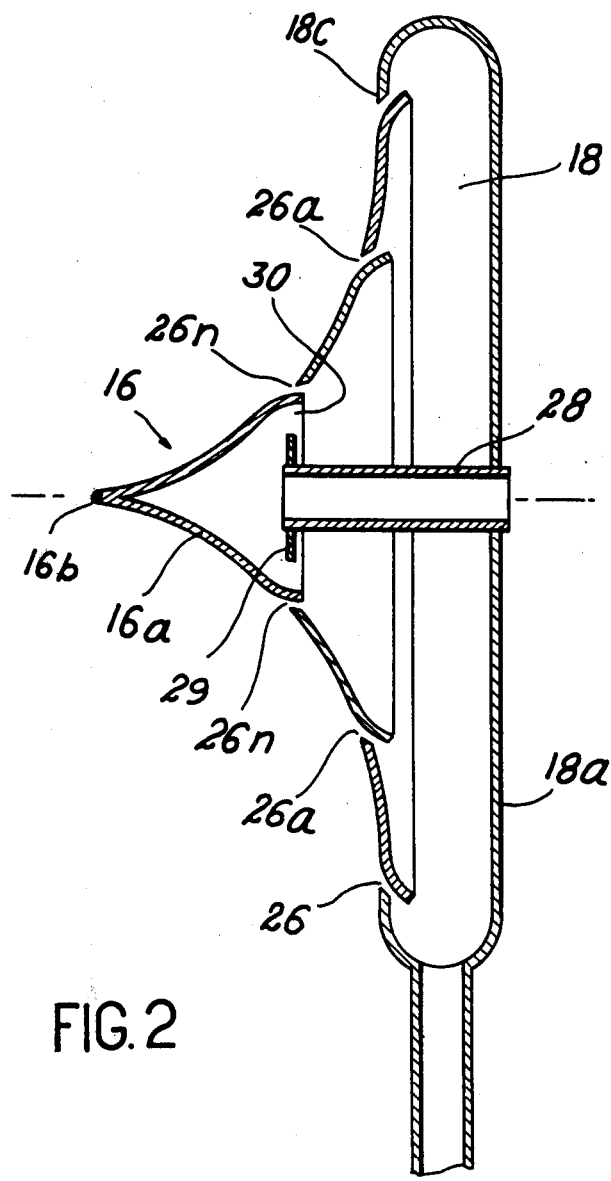
FIG. 2 is an alternative form of construction of the initial separator stage of a two-stage separator of the general type illustrated in FIG. 1.

In an alternative embodiment of the present invention as shown in FIG. 2, provision is made for a number of additional circular slits 26a . . .26n (two in the illustration), all similar to the slit 26, in the surface of revolution 16a in order to increase the efficiency of the apparatus.

It will be noted that the space 38 which is located between the surface of revolution 9 (first collecting means) and the surface of revolution 16a (second deflecting means) is bounded by the curved generator-lines of these respective surfaces and that this space is so dimensioned as not to introduce any pressure drop up to the openings of the partition-wall 20.

Rough separation of the drops of water is thus performed by directing the flow of saturated steam over curved surfaces such as those designated by the references 9 and 16a.

In fact, when the flow of steam passes into the casing 1 through the inlet duct 2, 2a (in the direction of the arrow $F_1$), the drops of water which flow in contact with the wall of the duct 2 in the form of a film pass through the slit 12, and the space 13, are dispersed over the first curved surface 9, and then fall into the chamber 11 so as to be finally discharged into the reservoir 6 under the action of gravity by means of the drain outlet 11b.

The vent 11a serves to evacuate the steam which has been aspirated together with the water and to produce within the chamber 11 a slight negative pressure which improves the efficiency of the slit 12 without either interfering with the flow of steam or limiting the pressure drop of the device.

At the same time, the flow of steam is projected onto the second curved surface 16a within the first compartment 22 and the drops of water in suspension are carried over that surface up to the trailing edge 16c, then passed through the slit 26 into the chamber 18 and are subsequently discharged to the reservoir 6 under the action of gravity by means of the drain-pipe 18d.

The efficiency of the slit 26 is improved by producing a negative pressure or partial vacuum between it and the second compartment 24 by means of a small flow of steam which passes through the chamber 18, the slit 26 and the stub-pipe 28.

The main stream which has now been freed from part of its drops of water in suspension flows through the perforations of the partition-wall 20 (arrow $F_2$) and passes through the fine separators 32 which remove the last traces of water in order to supply dry steam into the outlet duct 3 (arrow $F_3$).

The fine separators 32 remove the recovered water through the drain outlet 34 towards the reservoir 6. The entire quantity of water recovered is discharged through the flanged outlet connection 6a.

We claim:

1. A device for separating drops of a liquid contained in a gas stream, comprising:
   a closed casing provided with a horizontal inlet duct for the introduction of a gas stream to be treated and an outlet duct for the discharge of the treated gas stream, the interior of said casing being divided by a vertical grid into a first compartment into which said inlet duct has its opening and a second compartment in a wall of which said outlet duct is provided;
   said inlet duct being connected to said casing by an enlarged terminal portion of said inlet duct;
   a first deflecting means having flaring curved surfaces in coaxial alignment with said inlet duct and having its upstream end in tubular shape, located in said enlarged portion of said inlet duct and spaced from said inlet duct by an annular gap;
   a first collecting chamber bounded by said casing and a continuation of said flaring curved surfaces of said first deflecting means and connected to said inlet duct by said gap for collecting liquid drops to be separated which flow in contact with the inlet duct walls and having a drain for discharging said drops to a reservoir located at the bottom of said casing;
   a second deflecting means in the shape of a flaring surface of revolution coaxial with said first deflection means and having a projecting and tapered upstream end projecting into the space encircled by the flaring downstream end of said first deflecting means;
   a second collecting chamber on the side of said second deflecting means away from said first deflecting means and being positioned with respect to said second deflecting means to define an annular entrance slit adjacent to the downstream end of said second deflecting means, for collecting drops flowing off said second deflecting means and having a drain for discharging the collected drops of liquid to said reservoir;
   and fine-separation means located in said second compartment and interposed between said grid and said outlet duct.

2. A device according to claim 1, wherein said tubular upstream end of said first deflecting means is of the same internal diameter as the non-enlarged portion of said inlet duct.

3. A device according to claim 2, wherein said first collecting chamber is provided with a top vent connecting said chamber with said first compartment.

4. A device according to claim 2, wherein said projecting upstream end of said second deflecting means is in the shape of a cusp which is directed along its axis and points towards said inlet duct and in which the downstream end of said second deflecting means is curved to lead into said entrance slit of said second collecting chamber with a curvature opposite to that of the portion of said surface of revolution which is adjacent to said cusp.

5. A device according to claim 4, wherein said second collecting chamber includes a portion that is toroidal in shape and is placed adjacent to the grid which forms a separation between said two compartments of said casing, and wherein the toroidal portion of said second chamber has an outer edge overlapping the downstream edge of said second deflecting means.

6. A device according to claim 5, wherein the second collecting chamber is provided with a vent pipe connecting the interior of the second collecting chamber and the second compartment of said casing, and is further provided with a deflector mounted on said vent pipe so as to provide a restricted passageway between the volume behind the projecting and flaring portion of said second deflecting means and the toroidal portion of said second collecting chamber.

7. A device according to claim 4, wherein the second collecting chamber has a back wall substantially in alignment with said grid and having an outer inturned rim and said second deflecting means further comprises spaced surfaces having end portions overlapping each other to define at least one additional annular entrance slit coaxial with said first mentioned entrance slit adjacent to the downstream end of said second deflecting means, each of said spaced surfaces having a trailing edge curving into one of said at least one additional entrance slits and being overlapped by either the leading edge of another said spaced surfaces or said outer inturned rim of said back wall of said second collecting chamber and having a leading edge overlapping either said downstream edge of said second deflecting means or the trailing edge of another of said spaced surfaces.

* * * * *